Jan. 4, 1949.  J. J. WILSON  2,458,326
APPARATUS FOR REMOVING RESIDUAL THREAD FROM BOBBINS
Filed March 12, 1947  10 Sheets-Sheet 1

INVENTOR.
JOHN J. WILSON
BY
Raymond Underwood
ATTORNEY

Jan. 4, 1949. J. J. WILSON 2,458,326
APPARATUS FOR REMOVING RESIDUAL THREAD FROM BOBBINS
Filed March 12, 1947 10 Sheets-Sheet 2

INVENTOR.
BY JOHN J. WILSON
Raymond Underwood
ATTORNEY

Jan. 4, 1949.　　　　J. J. WILSON　　　　2,458,326
APPARATUS FOR REMOVING RESIDUAL THREAD FROM BOBBINS
Filed March 12, 1947　　　　　　　　　　　　　　10 Sheets-Sheet 3
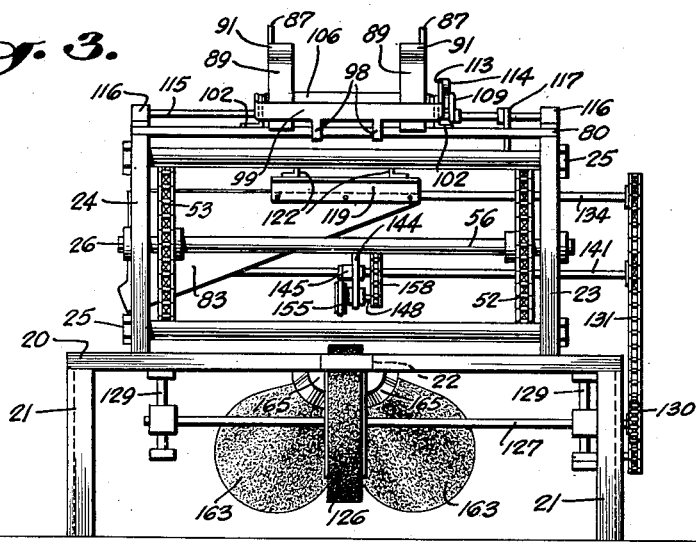
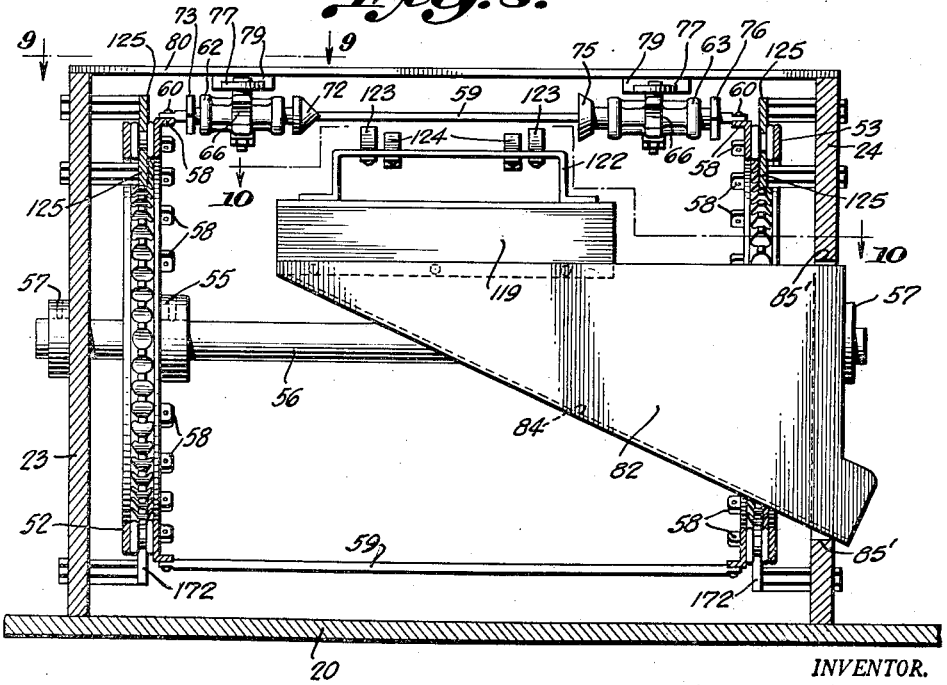
INVENTOR.
JOHN J. WILSON
BY
Raymond Underwood
ATTORNEY

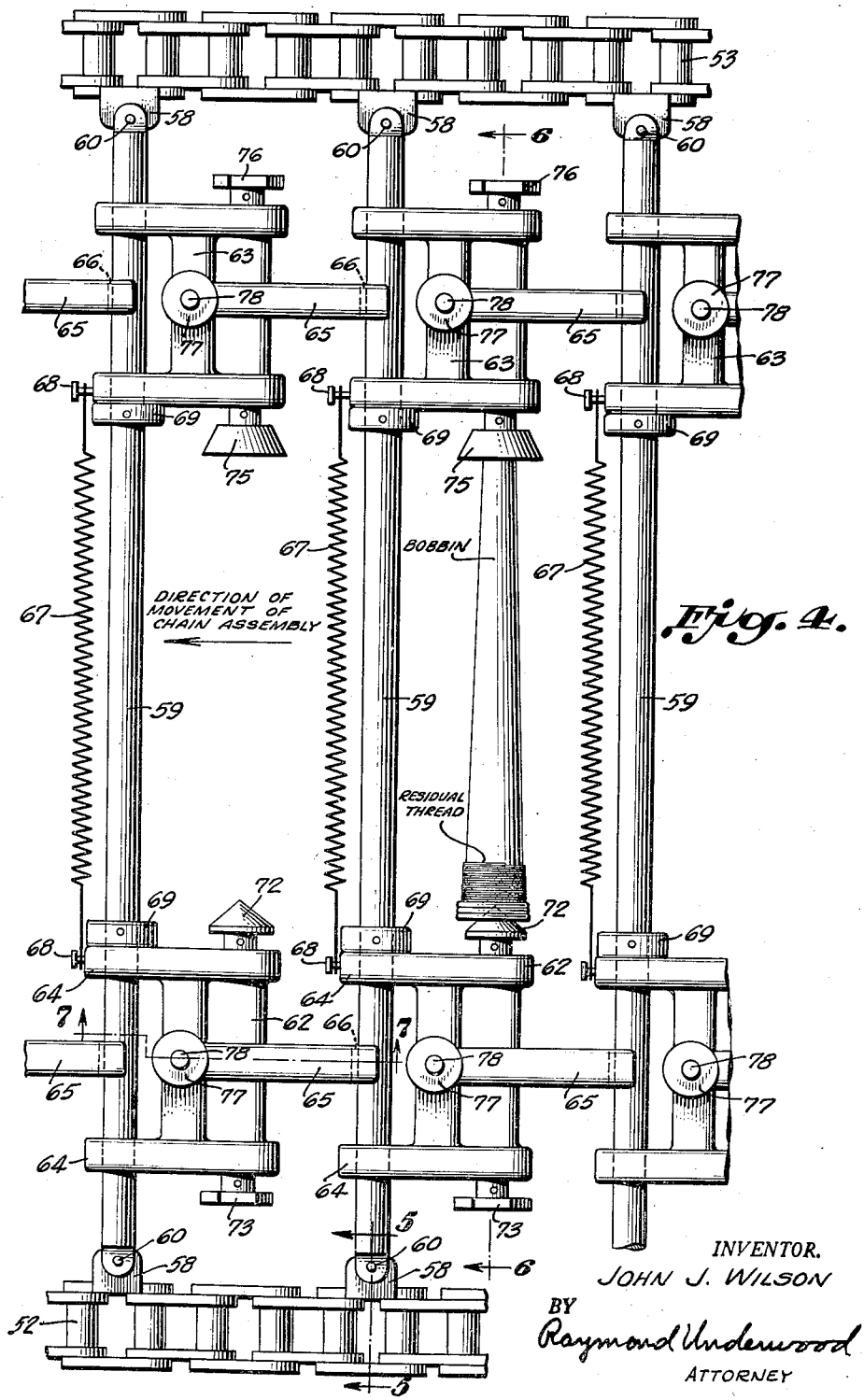

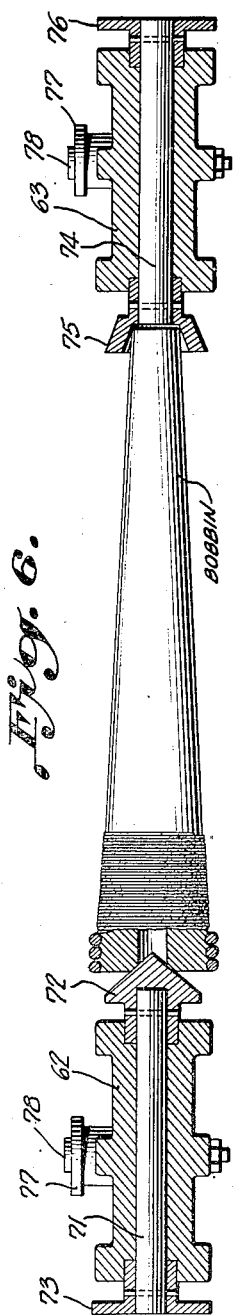

Jan. 4, 1949. J. J. WILSON 2,458,326
APPARATUS FOR REMOVING RESIDUAL THREAD FROM BOBBINS
Filed March 12, 1947 10 Sheets-Sheet 6

INVENTOR.
JOHN J. WILSON
BY
Raymond Underwood
ATTORNEY

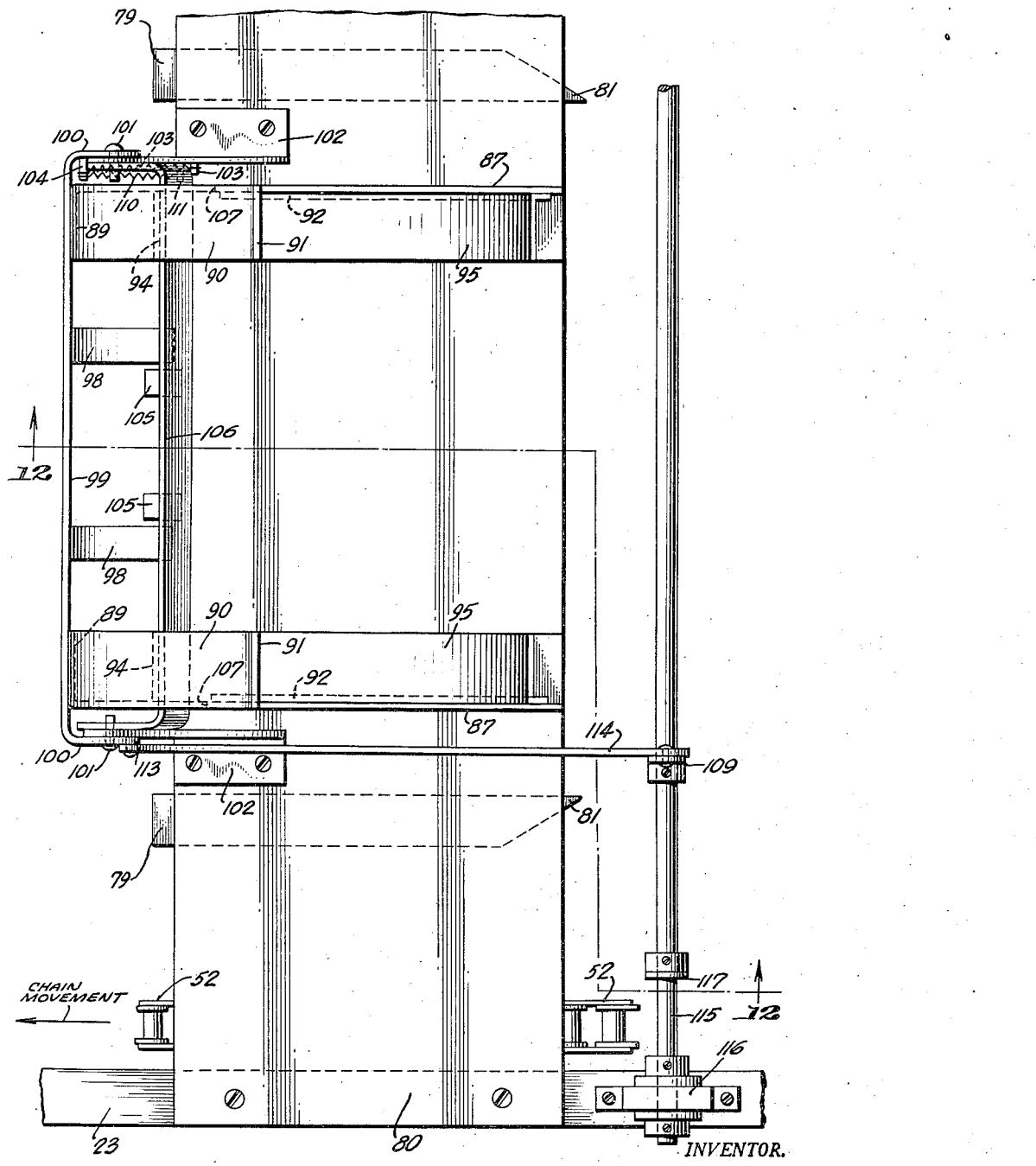

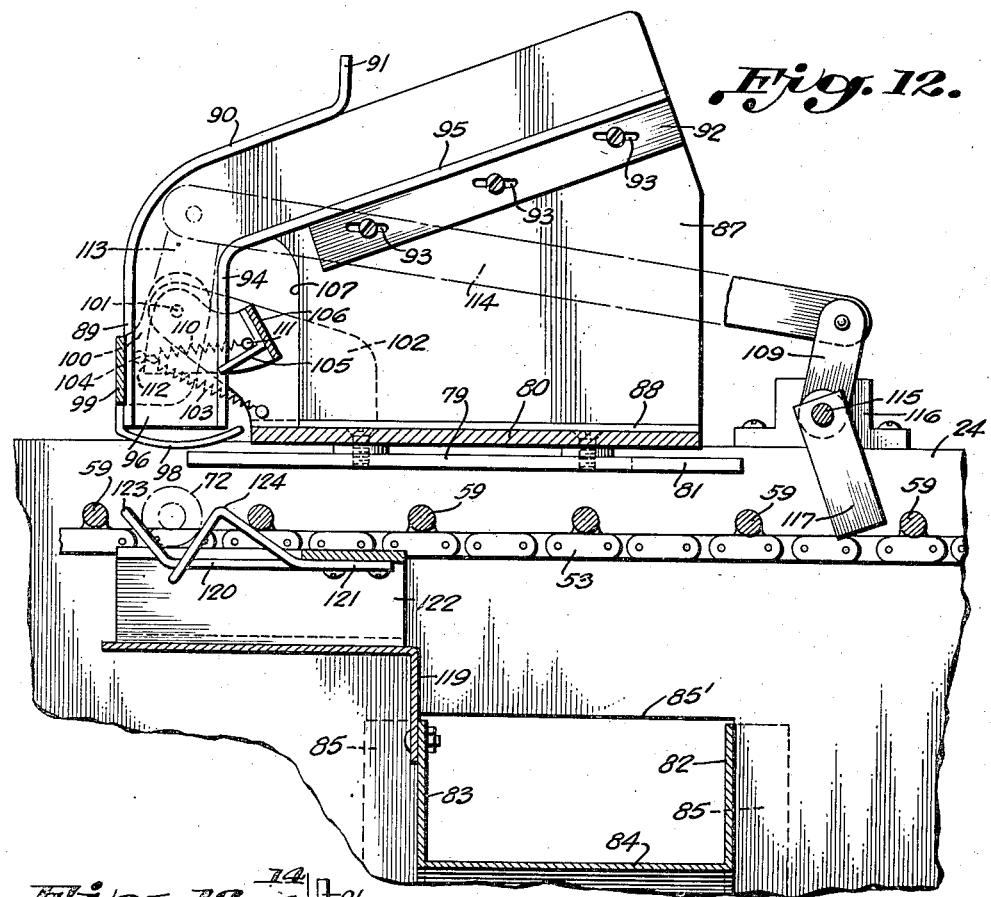

Jan. 4, 1949. J. J. WILSON 2,458,326
APPARATUS FOR REMOVING RESIDUAL THREAD FROM BOBBINS
Filed March 12, 1947 10 Sheets-Sheet 10

INVENTOR.
JOHN J. WILSON
BY Raymond Underwood
ATTORNEY

Patented Jan. 4, 1949

2,458,326

UNITED STATES PATENT OFFICE 2,458,326

APPARATUS FOR REMOVING RESIDUAL THREAD FROM BOBBINS

John J. Wilson, Watertown, Mass., assignor to Doelcam Corporation, West Newton, Mass., a corporation of Massachusetts Application March 12, 1947, Serial No. 734,284

30 Claims. (Cl. 28—19)

This invention relates to bobbin-stripping machines and more particularly to a machine for removing the remaining thread end from a used bobbin.

It is intended that the term "bobbin" as herein used be considered as a generic word for any article upon which thread is wound in package form for storage or handling or processing purposes. Thus, the word "bobbin" is intended to apply to spools, reels, and like articles. Such bobbins are used largely in the textile industry to supply the material which is being fabricated in a subsequent process by weaving, spinning, winding, drafting or knitting, for examples. One instance of their use is the bobbin which is present in the shuttle of a loom to carry the weft thread.

When such bobbins are used in making up a fabric, it is impractical to wind all of the thread off of the bobbins, because if this is done the end of the thread may terminate in the fabric. To avoid such an occurrence, the bobbin is removed from the fabric making machine before all of the thread has been drawn off of the bobbin. A new filled bobbin is then substituted for this nearly depleted one. One common means for automatically ejecting a nearly depleted bobbin includes a device which continuously feels the bobbin to determine the amount of thread remaining upon it. When this feeler device no longer contacts the thread at a certain point on the bobbin, it is an indication that very little thread remains. The bobbin is then automatically ejected from the machine, and a new filled bobbin is substituted.

It is necessary to remove from the ejected bobbin this small amount of thread which remains upon it before a new thread is wound upon the bobbin. This is important because if the small amount of residual thread were allowed to remain upon the bobbin, among other things its presence would be a false indication to the feeler device that the end of the new thread is not yet approached. As a consequence, the new thread on the bobbin may be completely drawn off with the possibility that its end would occur within the fabric before a new filled bobbin is substituted.

All of the thread should therefore be removed from the bobbin after it is ejected from the machine, but the removal of this residual thread is a laboriously manual task. It is necessary to find the broken end and to draw the thread off manually, and this loose end can be found only with difficulty. It is impractical to cut the thread off the bobbin because this damages the bobbin and causes sharp edges upon which the thread may become caught and be injured. The removal of this residual thread from the bobbin has consequently been an expensive manual operation.

Machines have been devised to remove the thread from the bobbin, but the machines heretofore manufactured have not been entirely satisfactory. For example, machines have been devised which remove the thread by the use of compressed air, but as a considerable amount of compressed air is required a large and expensive compressor unit is required. Moreover, the machines have not been satisfactory for the additional reason that they have not cleaned all of the bobbins passed through them. It has consequently been necessary to go through the bobbins which have passed through the machine in order to pick out the ones which have not been cleaned, and to return them to the machine. This has necessarily reduced the over-all capacity of the machine.

The machine of the present invention satisfactorily and effectively removed all of the thread from a bobbin. This is accomplished in a positive manner so that all of the bobbins being passed through the machine have the entire amount of residual thread removed from them. Moreover, the machine of the present invention is of small size and consequently occupies but small floor space. In addition, the machine of the invention has a low power requirement so that it is inexpensive to operate. Because of the novel design of the machine, it handles a large number of bobbins per unit of time so that one machine can handle the bobbin from a large number of fabric forming machines. Furthermore, the machine does not scar or otherwise scratch or damage the bobbins and thus saves the expense of more frequent bobbin replacement and reduces the number of defects in the yarn or other material caused by the use of damaged or otherwise scarred or scratched bobbins. These are the objects and accomplishments of the machine of the invention.

A preferred embodiment of the machine is illustrated in the accompanying drawing in which:

Figure 3 is an elevational view of the left hand end of Figure 1.

Figure 4 is a plan view of a portion of the chain carrier and associated parts, on an enlarged scale.

Figure 5 is a sectional view on the line 5—5 of Figure 4.

Figure 6 is a sectional view on the line 6—6 of Figure 4.

Figure 7 is a sectional view on the line 7—7 of Figure 4.

Figure 8 is a sectional view on the line 8—8 of Figure 1, on an enlarged scale.

Figure 10 is a sectional view on the broken line 10—10 of Figure 8.

Figure 11 is a plan view of the hopper.

Figure 12 is a sectional view through the hopper, on the line 12—12 of Figure 11.

Figure 13 is a sectional view similar to Figure 12, with the parts in the position they assume after the lowermost bobbin has been delivered.

*Framework*

Figure 1:
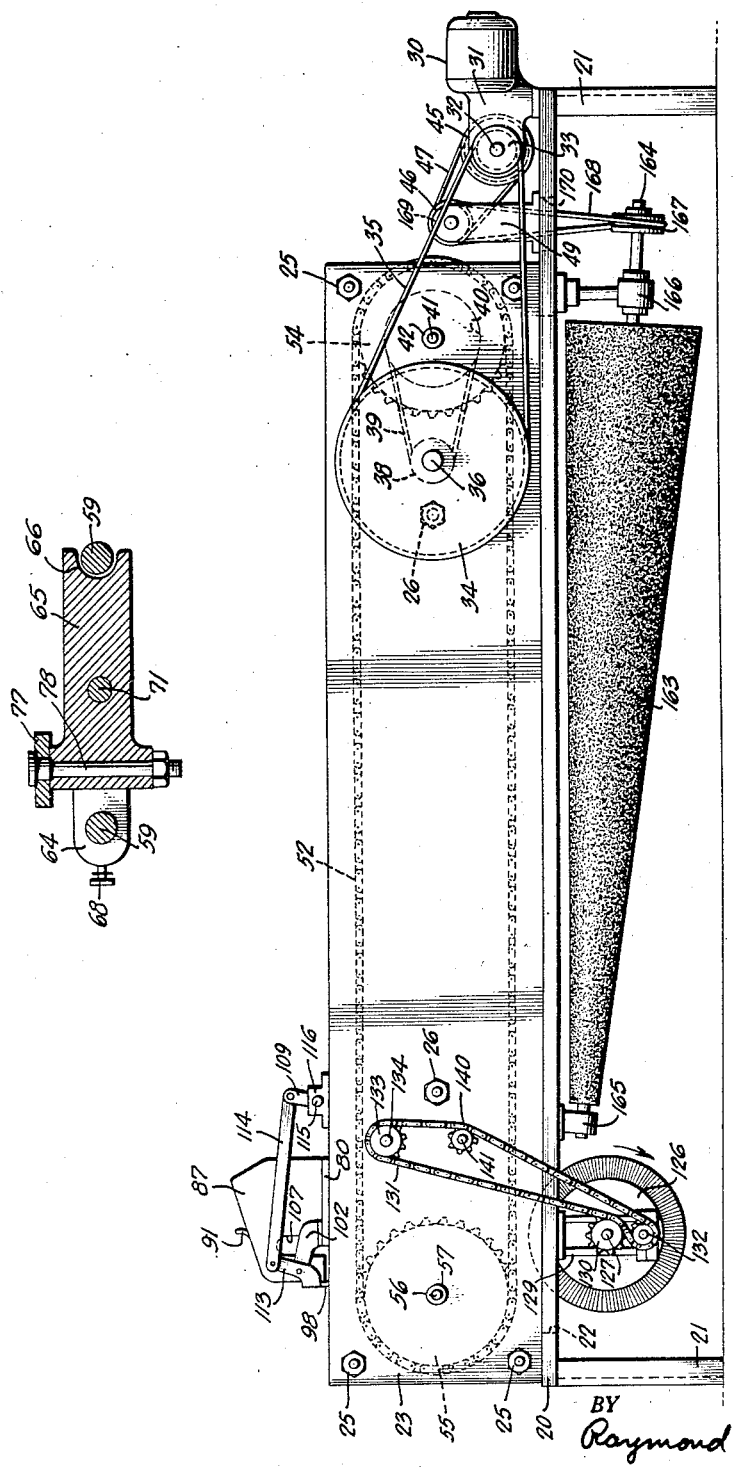
Figure 1 is a side elevational view.
Figure 2:
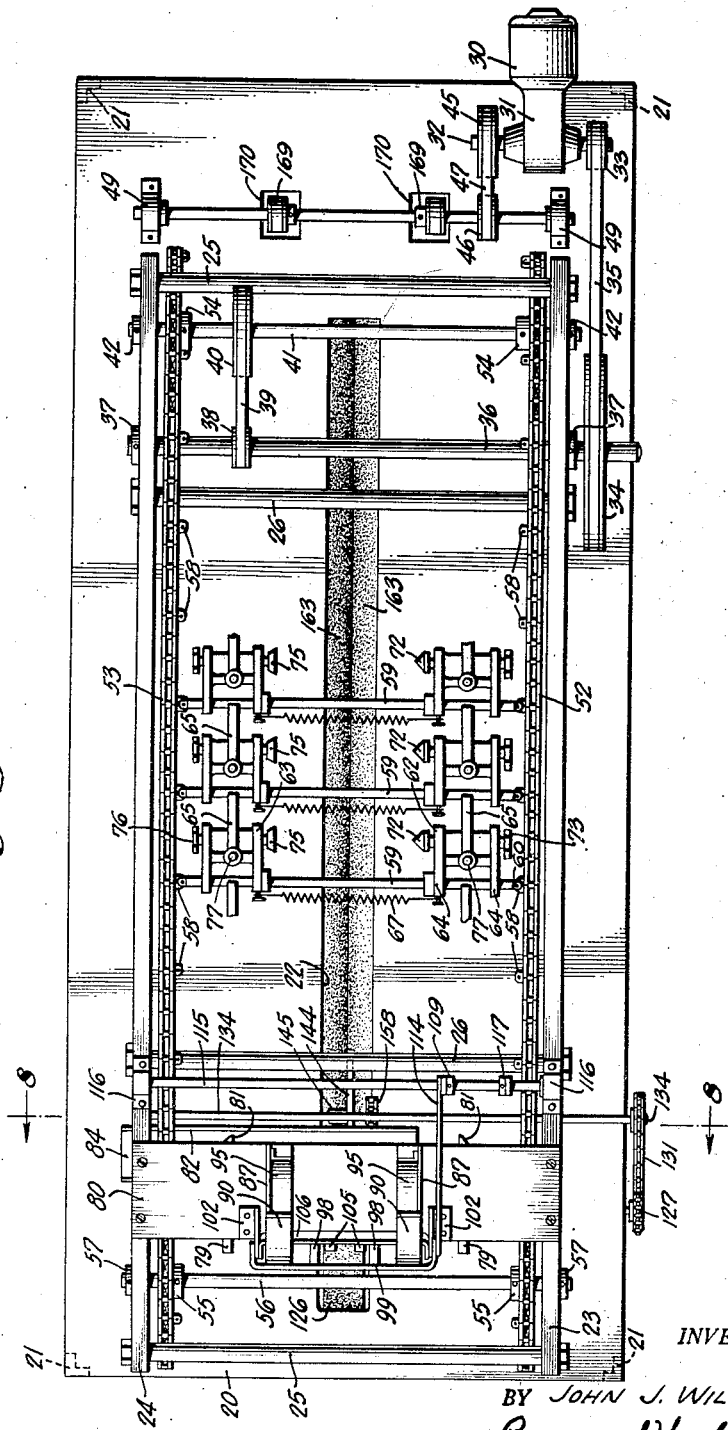
Figure 2 is a plan view.

The framework of the machine here illustrated includes a base plate 20 which is supported in an elevated position by means of legs 21 at its corners. The base plate 20 is of an elongated rectangular oblong form and preferably is a flat plate. Extending lengthwise of the plate and along the center thereof is a slot 22. This slot 22 terminates short of each end of the base plate 20.

The legs 21 at the corners of the base plate 20 are secured to the base plate by any convenient means as by welding. In the machine as actually devised the legs 21 are preferably secure to the base plate 20 by additional angle irons and by braces, but in order to illustrate the working element of the machine more clearly, such reinforcing members have been omitted from the drawing. Such reinforcing means may additionally include, for example, strengthening members extending both lengthwise of and transversely of the base plates 20.

If desired, the framework may be wheeled so that it may be moved about. To accomplish this, wheels, such as castors (not shown) may be attached to the lower ends of the legs 21.

Secured to the top of the base plate 20, as by welding, for example, are upright plates 23 and 24. These plates are spaced apart from each other and extend lengthwise of the base plate 20. It will be observed that the upright plates 23 and 24 extend substantially the full length of the base plate 20 and that they are spaced slightly inwardly from the longer sides of the base plate 20.

To support plates 23 and 24 in their spaced apart relationship they are secured by cross tie-bolts 25 and 26. The tie-bolts 25 are at the corners of the upright plates 23 and 24 and the tie-bolts 26 are inwardly from the ends of the plates and at an intermediate height.

It will be understood that the tie-bolts 25 and 26 are shouldered at their ends so that the plates 23 and 24 may be clamped tightly thereagainst by the nut at the end of each tie-bolt in order to rigidly space the plates from each other. It will also be understood that additional reinforcing or strengthening members may be provided for the upright plates 23 and 24, but that they have been omitted from the present drawing in order to more clearly show the more important structural elements.

It is important to note that the framework that has been illustrated and described herein is not the only suitable construction. For example, the machine framework may as well be devised essentially of piping which is threaded together in order to form a rigid framework. The plates which are here shown as being in one piece may in fact be in several pieces, and it is not essential that they extend for the full length of the machine inasmuch as only the end portions thereof are essential to support the operating element of the machine.

*Power drive*

The source of power for the machine may be any prime mover as, for example, the electric motor 30 secured to base plate 20. This motor 30 preferably has an attached gear reducer 31 from both sides of which extends a shaft 32. To one projecting end of the shaft 32 is attached a drive pulley 33 which drives a larger pulley 34 through a belt 35. The pulley 34 is attached to a cross shaft 36 which is bearinged in any suitable manner in the upright plates 23 and 24. The shaft 36 is prevented from endwise movement by means of collars 37 attached thereto. It will be observed that the pulley 34 is on the outside of the upright plate 23.

Between the plates 23 and 24 is a drive sprocket 38 which is attached to the shaft 36. A chain 39 connects sprocket 38 to a sprocket 40 upon a shaft 41. Shaft 41 is also bearinged in any suitable manner in the upright plates 23 and 24 and is prevented against endwise movements by means of collars 42.

To the other projecting end of shaft 32 of the gear reducer 31 is secured a pulley 45. Pulley 45 drives a pulley 46 through a belt 47. The pulley 46 is attached to a shaft 48 which is supported at its ends in upright standards 49. It is preferable that these standards 49 be adjustable in heights. The standards 49 are attached at their bases to the base plate 20.

It will be observed that the shaft 41 is driven at a reduced speed with respect to the shaft 32, whereas the shaft 48 is driven at an increased speed with respect to the shaft 32. The shaft 41 and shaft 48 are driven by the common motor 30 and its reduction gear 31, but it will be apparent from the following description that it is entirely possible to have separate sources of power for shaft 41 and shaft 48.

It may be mentioned that if desired, a friction drive clutch may be interposed at any point within the driving elements. Such a friction drive will permit a slippage to occur between the driving motor and the driving elements of the machine itself in the event that some part of the machine becomes jammed. This provision is a safety factor and need not be included unless thought necessary.

*Chain carrier drive*

The bobbins to be cleaned are carried through the machine by means of a chain drive. This includes two spaced chains 52 and 53. These chains pass over and are driven by sprockets 54 attached to the shaft 41. At the other end of the machine the chains 52 and 53 pass around sprockets 55 which are attached to a cross shaft 56. Shaft 56 is bearinged in any suitable manner in the side plates 23 and 24 and are held against end-wise displacement by collars 57.

The chains 52 and 53 preferably are of conventional roller construction. At regular spaced intervals along the length of the chains 52 and 53, the inner side links are provided with bolting lugs 58 as is best shown in Figure 5. Corresponding lugs 58 on the two chains 52 and 53 are directly opposite from each other.

Bobbin supports

Cross rods 59 are secured to the corresponding, i. e., directly opposite, lugs 58 of the two chains 52 and 53 by means of pins 60. It will be noted that all the cross-rods are spaced equally from each other.

Pivotally mounted upon each cross-rod 59 are two pivot holders 62 and 63. These pivot holders are identical in construction and therefore a description of the one will suffice. Considering the pivot holder 62, it includes fork portions 64 through which are aligned holes to receive the cross-rod 59. Projecting in the opposite direction from the fork portions 64 is a rearward extension 65. This extension 65 projects rearwardly far enough to meet the next cross-rod 59 and its rearward end is notched at 66, as shown in Figure 7, to receive the next cross-rod. The pivot holders are rotatably mounted upon one cross-rod 59 and are held in an upper position by contact of their rearward portions 65 with the next succeeding cross-rod, as appears from Figure 7.

The pivot holders 62 and 63 on each cross-rod 59 are drawn toward each other by means of a spring 67. This spring 67 is attached to lugs 68 projecting from the forked portions 64 of the two holders 62 and 63, which are disposed toward each other. To limit the movement of the pivot holders 62 and 63 toward each other, collars 69 are secured to the cross-rods 59 at spaced apart points.

Because of the pivotal mounting of the holders 62 and 63 upon their cross-rods 59 and because of their pivotable connection at 66 with the next cross-rod, they do not interfere with the continuous movements of the chains 52 and 53 around the sprockets 54 and 55. In passing around the sprockets the space between the pivot holders shortens because the chordal distance is less than the arc, and this is permitted because of the slot connection 66 with the next adjacent cross-rod 59. It will be noted that the rearward extension 65 contacts the cross-rod 59 between the forked projections 64 so that there is no interference between these portions.

Rotatably mounted within each of the pivot holders 62 and 63 is a pivot to hold the bobbin to be cleaned, and as here shown the pivots for the opposite ends of the bobbin are of different construction. (See Figure 6.) Considering first the pivot in the pivot holder 62, this includes a shaft 71 which is rotatably mounted in the pivot holder so as to be substantially parallel to the rod 59 and to be at a point substantially midway between two adjacent rods 59. Secured to the inner end of shaft 71 is a bobbin support element 72 which presents an outer forward conical surface to enter the bore hole through the bobbin. Secured to the other end of the shaft 71 is a lock member 73 which presents an outer flanged portion which preferably is of hexangular shape. The purpose of the hexangular shape will be explained later. The elements 72 and 73 prevent endwise movement of the shaft 71 within the pivot holder 62.

The pivot within the holder 63 is of similar construction as it includes a shaft 74 which is rotatably mounted within the holder 63 in such position as to be in axial alignment with the pin 71. To the inner end of the shaft 74 is affixed a bobbin contact element 75 which may be of the same conical formation as the element 72 to enter the hole in the bobbin. However, the support 75 shown here is intended to be used with a bobbin having one end smaller than the other, and for this reason the support 75 has an inner conical surface into which the small end of the bobbin seats to be centered thereby. To the opposite end of the shaft 74 is affixed a member 76 which provides a hexangular peripheral surface, corresponding to the member 73.

Withdrawal of bobbin pivots

In order to receive a bobbin between the two holders 72 and 75 it is merely necessary to separate the holders 62 and 63. This is accomplished by sliding them along the supporting rod 59 in a direction opposite from each other and against the pressure exerted by the spring 67. To accomplish this separating movement, each holder 62 and 63 is provided with a roller 77. (See Figure 7.) This roller 77 is pivotally mounted upon a shoulder bolt 78 which passes vertically through each of the holders 62 and 63. At the proper time these rollers 77 contact their respective cam plates 79, and this urges the holders 62 and 63 away from each other so that the space between them is widened and a bobbin may enter between them.

Figure 9:
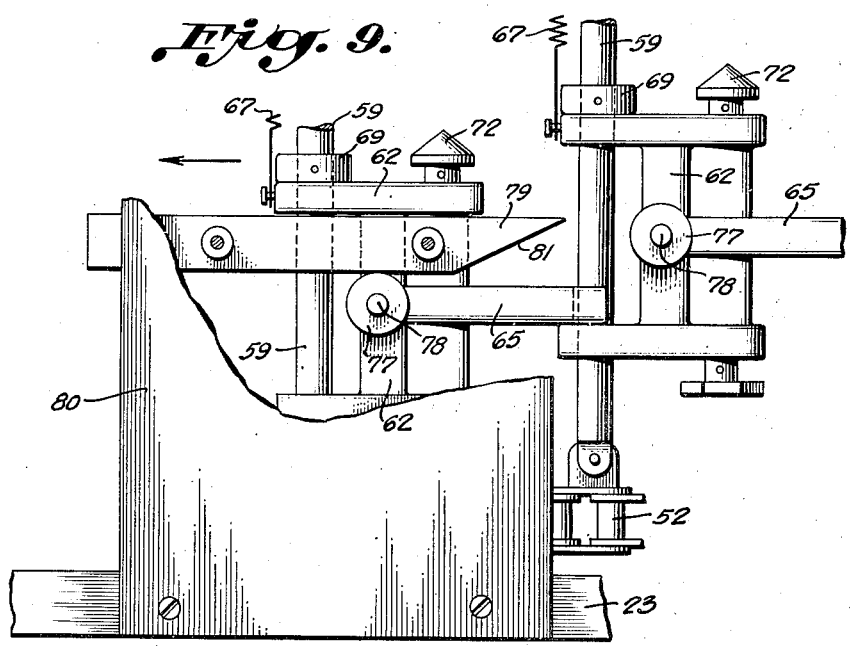
Figure 9 is a sectional view on the line 9—9 of Figure 8.

As here shown, these cam plates 79 against which the rollers 77 contact, are supported on the under side of a cross plate 80. (See Figure 9.) This cross plate 80 rests upon and is attached to the upright plates 23 and 24 at the proper point along their length. The cam plates 79 are each provided with a forward inclined portion 81 as shown in Figure 8 against which the rollers 77 initially contact. The bobbin pivots 72 and 75 and their respective holders 62 and 63, are urged away from each other by the cams 79, to cause the cleaned bobbin between them to be discharged, and also to permit the bobbin to be cleaned to be inserted between them.

Cleaned bobbin discharge chute

The arrangement of the chute for discharge of the cleaned bobbins will be explained at this point because this chute affords a support for other structure of the machine, as will later appear.

The chute consists of a channelled member having side walls 82 and 83 and a bottom sloping wall 84. This chute extends through an opening 85' in the side wall 24, transversely of the machine and nearly to the other side wall 23, as appears from Figure 10. To hold the chute in place, the side walls 82 and 83 have outwardly bent flanges 85 which are screwed or welded to the side wall 24.

The discharge chute is located at such a place lengthwise of the machine, that it is beneath the cams 79 which separate the bobbin carriers 72 and 75. As a consequence, when the cams 77 strike the inclined surfaces 81 of cams 79, the bobbins drop into the discharge chute and slide along the inclined bottom wall 84 thereof to a point aside of the machine. The cleaned bobbins leaving the chute may be collected in any suitable receptacle.

Bobbin supply

It has been stated that the bobbins to be cleaned are carried about in the machine by means of the holders 72 and 75 supported by chains 52 and 53. It has also already been pointed out that the holders 72 and 75 are withdrawn from each other by means of cams 79 so that the bobbins may enter between them. The present machine includes a hopper and bobbin supply means for delivering a bobbin between each pair of holders 72 and 75.

It may first be stated that the bobbin supply means deposits a bobbin in such position between the chains 52 and 53 that when the holders 72 and 75 snap toward each other, the holders will grasp the bobbin. That is, when the rollers 77 on supports 62 and 63 leave the cams 79 and the holders 72 and 75 move toward each other, a bobbin should have been deposited in such position that the holders 72 and 75 will engage the bobbin.

The hopper into which the bobbins to be cleaned are placed includes two spaced apart upright plates 87 which have flanged bases 88 by which they are attached to cross plate 80. The forward vertical edges of plates 87 (forward with respect to the direction of travel of chains 52 and 53) have flanges 89 which are turned inwardly from the plates 87 so that they are directed toward each other. These flanges 89 continue part way along the top sloping edges of plates 87 as indicated at 90 and terminate in upturned lips 91.

Affixed to the inner sides of plates 87 are flanged members 92 which may be adjustably attached to plates 87 due to the screw and slot connections indicated at 93. These members 92 have flanged portions 94 which are spaced from and approximately parallel to portions 89 of the flanges of plates 87. Also the flanged portions 95 of members 92 are parallel to the portions 90 of the flanges of plates 87. The flanged portions 95, however, extend rearwardly beyond lips 91 to provide an open ledge upon which the bobbins to be cleaned may be placed.

As is apparent from Figure 12, therefore, the flanges 89—90 and 94—95 cooperate to form channelled guideways for the bobbins. By spacing the flanges 94—95 at the proper distance from flanges 89—90, the bobbins will be required to move downwardly to the exit at 96 in a single-file manner. It should be observed that this exit 96 is positioned ahead of the plate 80 so that the bobbins can drop free of plate 80.

To control the delivery of bobbins from the exit 96 so that only one is discharged at a time and at intervals corresponding to the pairs of holders 72—75, a gate mechanism is provided. This gate mechanism includes gate fingers 98 which normally underlie the exit 96 to prevent delivery of a bobbin until the proper instant. Fingers 98 are a part of a bar 99 which extends the full length of the spacing between the upright plates 87 and has inturned ears 100. These inturned ears are pivoted by pins 101 to the forwardly and upwardly extending portions of brackets 102. The brackets are attached to cross plate 80.

A spring 103 is attached to one of the brackets 102 and to one of the ears 100 at a post 104 thereon to serve to draw the gate fingers 98 beneath the exit 96. This action of the spring 103 is limited as the bar 99 bears against the flanges 89. If the bar 99 is turned about pivots 101 against the action of spring 103, the gate fingers 98 will be moved away from the exit 96 and the bobbin resting on the fingers will drop. It will be apparent however, that if only the gate fingers 98 were present to control the delivery of the bobbins, more than one bobbin would frequently drop from the exit 96 at one time, when the fingers 98 are withdrawn.

The gate mechanism, consequently, includes means for holding back all of the bobbins above the one which is being discharged from the exit 96. This hold-back means includes angles 105 which are adjustably attached to a bar 106 located on the opposite side of exit 96 from the bar 99. The ends of bar 106 extend beyond the upright plates 87 through openings 107 therein and these ends are turned inwardly and pivoted on pins 101.

Figure 14:
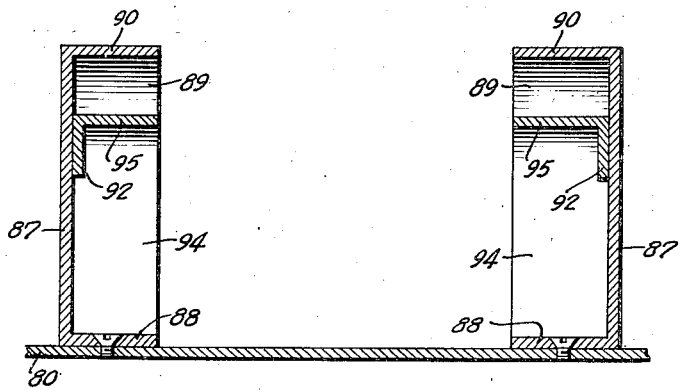
Figure 14 is a sectional view on the line 14—14 of Figure 13.
Figure 15:
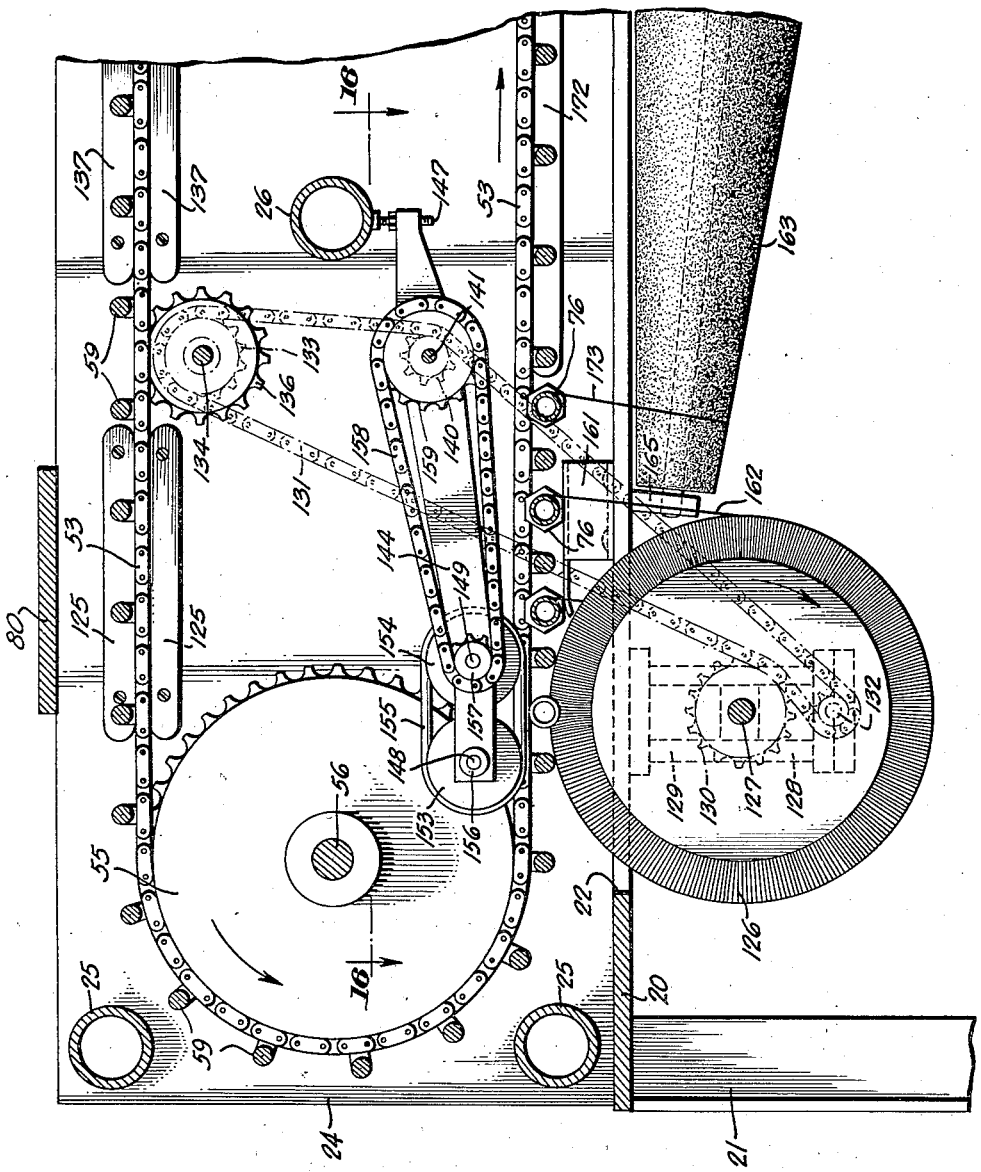
Figure 15 is an enlarged view of the left hand portion of Figure 1, the side plate being omitted.
Figures 16, 17:
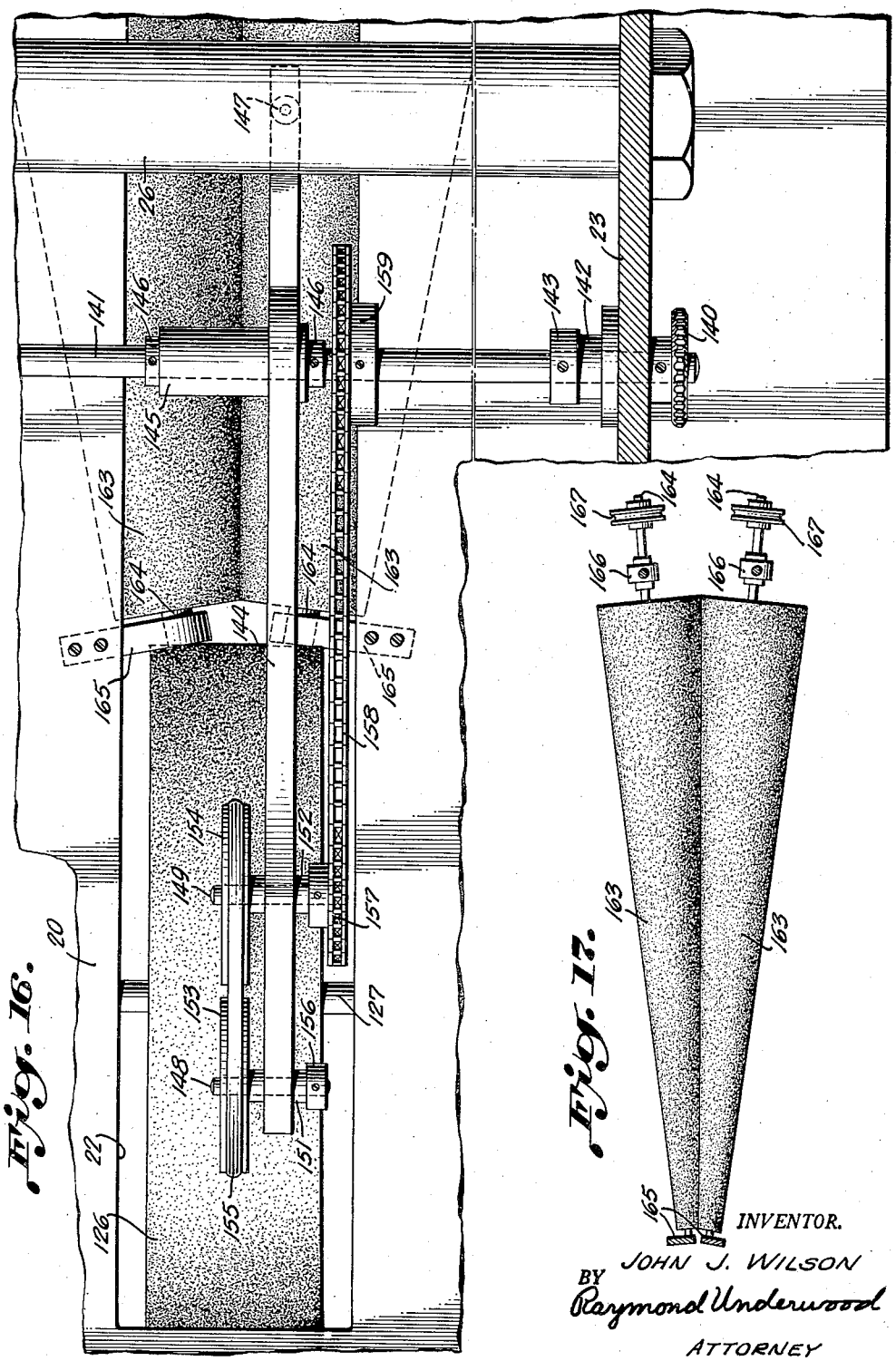
Figure 16 is a sectional view on the line 16—16 of Figure 15.
Figure 17 is a plan view of the conical rollers for drawing off the thread.

A spring 110 is connected to bar 106 at 111 and to post 104 and this spring 110 tends to draw the angles 105 into the space between the flanges 89 and 94. However, a shoulder at 112 on the inturned end of bar 106 bears against the post 104 and serves to hold the angles 105 outside of the space between the flanges 89 and 94. It is apparent therefore that when the parts are in the normal position shown in Figure 14, the bobbins are held up by the gate fingers 98 and the hold-back angles 105 are in an inactive position.

When bar 99 is moved to withdraw the fingers 98 from beneath the exit 96, the spring 110 acts to move the hold-back angles 105 into the space between the lowermost bobbin and next higher bobbin so that this next higher bobbin cannot fall. When the gate fingers 98 are sufficiently withdrawn, the lowermost bobbin drops out. The spring 110 permits a full opening movement of fingers 98, after the bar 106 strikes against the flange 94.

After the lowermost bobbin has been delivered, the fingers 98 are allowed to move to their normal position under exit 96, under the influence of spring 103. When post 104 strikes against shoulder 112, the hold-back angles 105 are moved out of their active position and the bobbin which has rested on angles 105 drops down on fingers 98. This delivery of a bobbin from exit 96, as has been stated, occurs periodically just before the passage of a pair of bobbin holders 72—75, beneath exit 96.

To periodically operate the bobbin delivery means, one of the inturned ears 100 of the bar 99 has an upward extension 113 which serves as a lever arm. A link 114 connects extension 113 to an upright arm 109 affixed to a cross shaft 115. The shaft 115 is rotatably mounted in bearings 116 secured to the tops of side plates 23—24. Also affixed to shaft 115 is a depending arm 117 which extends downwardly far enough to be contacted by crossrods 59 at a point close to chain 52 or 53.

The depending arm 117 should be so positioned lengthwise of the machine that it will be tripped by a passing rod 59 at the proper moment to cause a bobbin to be delivered just in advance of a pair of holders 72—75. As there is a pair of holders 72—75 for every cross rod 59, a bobbin will be delivered for every pair of holders 72—75, and a synchronous relationship is therefore established.

It has been stated that the holders 72—75 are urged apart from each other by the coaction of cams 79 and rollers 77. These cams 79 maintain the holders 72—75 apart until the holders are axially in line with the axis of the bobbin just discharged from the hopper. At the moment that this axial alignment is reached, the rollers 77 leave the cams 79 and the holders 72—75 move toward each other and pick up the bobbin.

Means are provided to accurately position the bobbin which has just been discharged from the hopper, so that it will be in the proper place to be engaged by the holders 72—75. This means includes a pair of flexible leaf supports 120—121 which are so located as to contact the bobbin just inwardly from its ends. The leaf supports 120—121 are attached to an inverted channel member 122 which is fastened to a bracket plate 119. Bracket plate 119 is secured to the upper edge of side wall 83 of the delivery chute.

The leaf support 120 of each pair has an upturned free end 123. The leaf support 121 is shorter than leaf support 120 and is formed with a hump 124 at its free end. It will be observed that the hump 124 and upturned end 123 cooperate to form a trough between them and that this trough is directly beneath the exit 96 from the supply hopper. When a bobbin is dropped from the hopper, the bobbin therefore falls into this trough and is retained therein in the proper position to be picked up by a pair of holders 72—75. After the bobbin is engaged by a pair of holders, the leaf supports 123 yield downwardly to permit the bobbin to advance with the movement of chains 52—53.

To assure linear movement of the holders 72—75 in the proper position as they are about to move toward each other and pick up the bobbin, the chains 52—53 each pass between a pair of guide rails 125 which contact the rollers of chains 52—53. These rails serve to prevent any sagging or lifting movement of the chains 52—53 in the region of the supply hopper and also assure contact of rollers 77 with cams 79. The guide rails 125 are supported by the side upright plates 23—24.

*Thread end removal from bobbins*

The bobbins to be cleaned, which are carried along by the chains 52—53 in the manner described, pass around the sprocket wheels 55 and are moved along with the under flight of chains 52—53. Here, the bobbins are immediately brought into contact with the peripheral surface of a brush 126. This brush is rotated in such a direction that its periphery at the point of contact with the bobbin, is moving in the same linear direction as the linear movement of the bobbin. The relative rates of these linear speeds will be later referred to.

It may be explained at this point that the brush 126 serves the important function of finding the outer end of the thread on the bobbin and lifting this end away from the bobbin. This is a foremost feature of the invention as this arrangement serves to accomplish by mechanical means what is ordinarily performed by manual effort. Briefly stated, the outer end of the thread on the bobbin, is picked up by rotating the bobbin while in contact with the brush, and at the same time effecting a relative tangential movement between the bobbin and the brush surface. The rotation of the bobbin preferably is in the same direction that the thread is wound on the bobbin. Thus, if the bobbin, when regarded from one end, has the thread wound thereon in a clockwise direction, the bobbin should be rotated against the brush in a clockwise direction to cause the thread end to be picked up and lifted away from the bobbin.

In the machine illustrated here, it is intended that the bobbins all be placed in the hopper in such a position that when the machine is viewed from one long side, the thread on each bobbin will be wound thereon in a clockwise direction. This placement of each bobbin in the hopper does not require inspection of the thread on each bobbin, as it will be known in each situation how the threads are wound on the bobbin relative to a certain end of the bobbin. For example, with tapered bobbins, for the same looms and weaves, it will be known that if their large ends are all placed in the hopper in the same direction, the threads thereon will be all in the same direction. The machine here illustrated includes mechanism for rotating the bobbins in a clockwise direction when they are in contact with the brush and this mechanism will be described later.

It has been pointed out already that in addition to the rotation of the bobbin while in contact with the brush, there should be a relative tangential movement between the brush and the bobbin. This relative movement should be such that after the thread end has been picked up by the brush, this relative movement will tend to draw the thread off of the bobbin and extend it out in a generally linear direction. This action serves to prevent the thread from collecting at one point or bunching up in such a manner that the free end will be obscured.

It will be apparent that the linear movement of the chains 52—53 in advancing the bobbins may alone be relied upon to draw the thread end out after it has been picked away from the bobbin, and that independent rotation of the brush is not in this case essential, particularly if the bobbin were rotated and wound in the opposite direction from that which has been described. In fact, the invention contemplates the use of a stationary brush and reliance alone on the rotation of the bobbin and linear movement of the bobbin with the chains 52—53, and if this arrangement is practiced, the surface may be planar and be parallel to the linear movement of the bobbins. In like manner, the invention contemplates the accomplishment of the relative tangential movement between the bobbin and the brush by rotation alone of a cylindrical brush such as 126, which is illustrated, the linear movement of the bobbin being at this time arrested. Moreover, the invention can even be practiced by rotating the bobbin in a direction counter to the winding of the thread on the bobbin, if the bobbin is also advanced (or the brush is advanced) in such manner that the relative movement between the bobbin surface and brush is less than that due to the rotation alone of the bobbin, as this will serve to pick away the thread end.

However, it is preferable that the relative tangential movement between the bobbin and brush be effected by the combined rotation of a cylindrical brush and the constant linear travel of the bobbins. For this reason the machine here illustrated embodies these movements. It will be observed that the periphery of the brush, at the point of contact is moving in the same direction as the bobbins are carried by the chains 52—53. This serves to advance the removed thread in the same general direction with the advance of the bobbin so that the thread will be carried down substantially vertically away from the bobbins.

Rotation of the brush 126 is accomplished by attaching it to a shaft 127 which is rotatably mounted in bearings 128. The brush 126 extends upwardly through the slot 22 in base plate 20 so that its upper side will contact the bobbins being carried along by the under flight of chains 52—53. Bearings 128 are adjustably secured to hangers 129 depending from the under side of base plate 20. A chain sprocket 130 is attached to shaft 127 and a chain 131 is caused to bear against sprocket 130 by means of an idler 132 rotatably carried by the hanger 129 adjacent sprocket 130. Chain 131 passes over a sprocket 133 which is attached to a shaft 134 rotatably mounted in bearings 135 secured at openings in upright plates 23—24. Also attached to shaft 134 is a sprocket 136 which engages with the upper flight of main chain 52.

The movement of chain 52 therefore serves to drive sprocket 136 and by this power take-off means, the brush 126 is rotated. The chain 52 is maintained in engagement with the sprocket 136 by the conjoint action or rails 125 and a second pair of rails 137 through which the chain passes. Rails 137 are carried by the side upright plate 23. Sprocket 136 is positioned in the space between rails 125 and 137.

The movement of chain 131 is also utilized to cause rotation of the bobbins about their own axes when they are each in contact with brush 126. To accomplish this, chain 131 engages a sprocket 140 which is secured to a shaft 141. This shaft 141 is rotatably mounted in bearings 142 mounted on the side plates 23—24 and the shaft is held against axial movement by collars 143 affixed thereto.

An arm 144 is rotatably mounted upon the shaft 141 and to provide a larger bearing surface upon shaft 141, an elongated bushing 145 is attached to arm 144 and shaft 141 passes through this bushing. It will be observed that arm 144 overlies the slot 22 through the base of the machine and to hold the arm 144 at this position, collars 146 are affixed to shaft 141 on opposite sides of bushing 145. Arm 144 is, of course, free to rock on shaft 141, while the shaft 141 continuously rotates within bushing 145.

On one side of shaft 141, the arm 144 extends toward and over the brush 126, and in the opposite direction the arm extends a short distance and beneath the adjacent cross tie-bar 26. The tendency for the longer side portion of arm 144 to fall down upon the brush 126 is limited by a stop bolt 147 threaded into the shorter portion of arm 144 and bearing upwardly against tie-bar 26. This bolt 147 is adjustable in arm 144 to vary the extent to which the long portion of arm 144 can drop toward brush 126.

Two parallel shafts 148 and 149 are rotatably carried by arm 144, above brush 126 and to provide an elongated bearing contact these shafts rotate in bushings 151 and 152 secured within arm 144. Pulleys 153 and 154 are affixed to shafts 148 and 149 respectively, and a belt 155 passes around these pulleys. A collar 156 is secured to shaft 148 and a sprocket 157 is secured to shaft 148 opposite from pulleys 154 and 155 and prevent endwise movement of these shafts. Sprocket 157 is driven through chain 158 by a sprocket 159 attached to shaft 141.

It has been observed that shaft 141 is rotated by a sprocket 140 thereon which meshes with chain 131. Shaft 141 drives shaft 149 and the belt 155 is thereby continuously driven. It will be observed that this movement of belt 155 is not interfered with by a rocking movement of arm 144 about shaft 141, as arm 144 and sprocket 159 have in common, the axis of shaft 141.

The bobbin which is in contact with the brush 126 is rotated about its axis by the action of belt 155. The lower flight of belt 155 is substantially horizontal and therefore parallel to the direction of movement of the bobbins as they are carried along by chains 52—53. When a bobbin meets the traveling belt 155, the arm 144 can rise slightly by rocking about shaft 141, and the belt 155 then bears downwardly on the bobbin with sufficient frictional contact to rotate the bobbin while the bobbin is in engagement with brush 126. It will be observed that in the machine illustrated the bobbin is rotated by belt 155 in a direction opposite from the tendency of the brush 126 to rotate the bobbin, but it has already been noted that this is not a necessary relationship although it is preferred.

The combined action of the rotation of the bobbins about their own axes and the translation of the bobbins relative to the brush surface acts to pick out the thread end on the bobbin and to move it away from the bobbin. This thread end will be caught on the bristles of the brush 126 and this brush 126 will carry the thread away from the bobbin. After this action has occurred and the bobbin has left the belt 155, the rotation of the bobbin should preferably be arrested, as otherwise so much thread may be quickly unwound from the bobbin that it will not be taken up by brush 126, but will be carried around the bobbin and become entangled on the bobbin. At the moment that the bobbin leaves the belt 155, therefore, a braking action should act on the bobbin.

In the present machine, this braking action does not act directly on the bobbin, although this is contemplated, but instead the brakes act on the holders 72 and 75 and thereby serves to stop rotation of the bobbins. It has been explained that the bobbin supports 72 and 75 are attached to shafts 71 and 74, respectively, and that lock members 73 and 76 are attached to these shafts, respectively. These lock members 73 and 76 therefore rotate with the supports 72 and 75, and the bobbin carried thereby. Rotation of the lock members 73 and 76 is stopped by their contact with brake plates 161 carried by the base plate 20.

When the lock members 73 and 76 reach the brake plates 161, their rotation is stopped due to a flat side on the periphery of the lock members. It is for this reason that the peripheries of the lock members 73 and 76 are flattened and, as here shown, are of hexangular shape. The action of brake plates 161 will stop the rotation of the supports 72 and 75 and this will stop the rotation of the bobbin supported by them. As a consequence the removed thread will be pulled upon by the brush and this will keep this thread end taut.

It may here be pointed out that the flight of belt 155 against which the bobbin bears to be rotated, preferably is only long enough to contact one bobbin at a time. The length of this flight of the belt 155 is therefore about the same as the spacing between the bobbins. It has been mentioned that the braking action of plates 161 preferably starts immediately after the bobbin leaves belt 155, and this braking action preferably continues for a distance approximately equal to the spacing between the bobbins. By the time that the bobbin reaches the beginning of the braking action, the thread end on the brush 126 preferably should be carried about a third of the way around the brush and the brake keeps the thread from going around further so that the thread at the end of brake surface assumes approximately the position of the thread portion indicated at 162.

Before explaining the action of the thread draw-off means which follows next, it may be mentioned that although a brush 126 has been referred to, this element may have some other surface which will pick out the thread end from the thread on the bobbin. Thus, the element at 126 may have a soft fabric surface, but it is preferred that it have a bristled or setaceous surface. Also, while the belt 155 is preferably made of rubber, it may be made of leather or of some other material which will frictionally contact the bobbin.

Thread draw-off means

The thread is fully drawn off of the bobbins by a pair of conical rollers 163. The small ends of these rollers are toward and close to the cylindrical brush 126 and their shafts 164 are rotatably mounted in bearing blocks 165 attached to the base plate 20. The larger ends of the rollers 163 extend nearly to the motor end of the machine and at this end their shafts 164 are rotatably mounted in hangers 166 depending from the base plate 20.

Rollers 163 are disposed close enough together so that they contact each other along their entire lengths and this meeting zone is directly beneath the slot 22 through the base plate 20. In this respect, the rollers 163 should be so disposed that the point of contact between their smaller ends is in line with the thread portion 162 extending between the bobbin and brush 126. Continued movement of the bobbin with chains 152—153 will therefore draw the thread portion 126 to and between this meeting place between rollers 163. The rollers will then grasp the thread and pull it downwardly away from the rollers, and will also pull the short portion 162 away from the brush 126.

It will be clear that the rollers 163 are rotated in opposite directions and so that they are moving downwardly away from the bobbins at their meeting zones, as this serves to pull the thread off of the bobbins. To rotate the rollers 163, pulleys 167 are attached to shafts 164 and these pulleys are driven by belts 168 from pulleys 169 on shaft 48. Belts 168 pass through openings 170 in base plate 20 and it may be observed that these belts are twisted as shaft 48 is nearly at right angles to shafts 164.

The conical formation of the draw-off rollers 162 is a desirable, but not an essential formation. By having them of conical shape they exert a slow pull on the thread and therefor start the bobbins to rotate slowly as the thread is pulled off. As the bobbin is moved by chains 52—53 to the larger end of the rollers 162, the increasing peripheral speed of the roller surfaces gradually increases the pull off speed of the thread. As a result, there are no shocks on the thread which might break it and the final unwind may be at a high speed. This makes it possible to use shorter rollers 162 than could be used if they were cylindrical and of the same size as the small ends. Guide rails 172 for chains 52—53 resist this downward pull exerted on the threads in unwinding the bobbins.

Rollers 162 should be of sufficient size to draw off all of the thread on each bobbin by the time the bobbin is at the large end of the rollers. In this continued withdrawal of the thread from the bobbin, it will be clear that it moves downwardly, as indicated at 173, through the elongated slot 22 in base plate 20. The cleaned bobbin is carried by chains 52—53 around the chain sprockets 54 and is delivered onto the discharge chute bottom 84 in the manner already explained.

Preferably, rollers 163 are made of brushes, but as has been explained in connection with brush 126, they may be made to present a fabric surface. In fact, due to the actual gripping contact between rollers 163, they may have hard, smooth surfaces. If rollers 163 are made of brushes, the threads which collect on it may be periodically removed simply by cutting the threads off as by a knife. If the rollers 163 are made of smooth surfaces, the threads may be removed by breaking up the continuity of the smooth surfaces by lengthwise slots and into these slots a knife or other object may be inserted to quickly facilitate the removal of the thread. If this latter arrangement is employed, the rollers 163 should be so assembled that the slots will not meet one another at each rotation.

Operation and general arrangement

Although the operation of the machine has been referred to in the above description of the elements of the machine, a summary of this operation may be stated at this point. The bobbins to be cleaned are all placed in the hopper in such a manner that their threads will be unwound by clockwise rotation of the bobbins when the machine is viewed from the side at which the brush 126 has a clockwise rotation. As has been pointed out, this involves simply placing all of the large ends of the bobbins in the supply hopper, in one direction, since it will be known that this will uniformly locate the bobbins from similar groups of machines so their threads will be unwound upon clockwise rotation. The bobbins are placed on flange 95 of the hopper and they descend by gravity between flanges 89 and 94 to the exit at 96.

In setting up the machine, the upright plates 23 and 24 and the parts carried by them should be so positioned on the base plate 20 that the thread remaining on the bobbin will come into contact with the brush 126. This involves merely the shifting of the assembly, of which plates 23 and 24 are a part, laterally to one or the other long side of base plate 20 and affixing plates 23 and 24 at this location. This lateral adjustment is accommodated by shifting pulley 34 to the proper position along shaft 36. When the correct relationship is established, the thread on the bobbins will be directly over slot 22 in base plate 20.

The bobbins are delivered serially from the exit 96 of the hopper by withdrawal of the gate fingers 98. The bobbin which is above this bobbin about to be delivered is held back by movement of the hold-back angle 105 between these bobbins. This serial discharge of a bobbin is controlled by contact of cross-rods 59 with arm 117 which is operatively connected to this gate mechanism. As a result of this, a bobbin is delivered for each pair of holders 72—75.

The bobbin delivered from the hopper drops upon the flexible leaves 120—121 and is held by them in such a position that the holders 72—75 will engage the ends of the bobbin. Holder 72 is of conical shape to enter the bore at the large end of the bobbin, and holder 75 may be of conical or cup-shape to seat over the small end of the bobbin. Holders 72 and 75 are separated from each other by the coaction of cams 79 and rollers 77 until the instant that holders 72 and 75 are in line with the bobbin axis. At this moment the rollers 77 drop off of cams 79 and the holders 72 and 75 move toward each other and pick up the bobbin.

The bobbin is carried by chains 52—53 into contact with the rotating brush 126 and while in contact with this brush the bobbin is rotated about its own axis by contact with friction belt 155. This serves to remove the thread end from the bobbin and to draw off a short length of thread. After the bobbin leaves the belt 155, rotation of the bobbin is arrested by the braking action of brakes 161 against the bobbin holders 72—75.

The short length of thread pulled off of the bobbin is caught between conical rollers 163 which serve to pull all of the thread off of the bobbins. The cleaned bobbins are moved by chains 52—53 to the top flight and upon contact of rollers 77 with cams 79, the holders 72—75 are separated and the cleaned bobbin drops upon the sloping bottom wall 84 of the discharge chute.

The apparatus may be used with other types of thread carriers than the conical bobbins illustrated. For example, if ordinary spools having large flanges are used, the hopper may be similar to the one illustrated but of larger size. It is even possible, with such large spools, to dispense with the gate mechanism and to let the spools fall successively between the cross-rods 59 since this space is only large enough to accommodate one spool. In this case, the holders 72—75 are midway between the rods 59. In handling spools of such large size the spools may fall directly upon the upper surface of member 122, as the yieldable leaves 120—121 will not be necessary. Other similar adjustments or modifications may be made in the illustrated machine to permit its use with different sizes and shapes of thread carriers.

It will be apparent that the thread-end finding means which here involves the brush 126, and the means including belt 155 for rotating the bobbin, may be used alone if desired. Thus, this mechanism of the complete machine may be used to find and pick out the thread end and to pull off a short portion of the thread. Thereafter, the thread can be entirely removed by other means such as by manually grasping this withdrawn thread portion. Such an expedient may be resorted to, to reduce the length of the apparatus required. Moreover, the bobbins to be cleaned could be fed to such a thread-end removing mechanism by hand or by using the automatic hopper supply which has been illustrated.

What I claim is:

1. Apparatus for removing the residual thread from bobbins which comprises a member presenting a yieldable thread-clinging surface, and means acting independently of said member for rotating the bobbin with its thread in contact with said surface and in the direction to pick out the thread-end on the bobbin.

2. Apparatus for removing the residual thread from bobbins which comprises a member presenting a yieldable thread-clinging surface, and means acting independently of said member for rotating the bobbin with its thread in contact with said surface and in the same direction that the thread is wound on the bobbin to thereby pick out the thread-end on the bobbin.

3. Apparatus for removing the residual thread from bobbins which comprises a setaceous member, means for supporting the thread in contact with said setaceous member and effecting a relative tangential movement between them, and means acting independently of said member for rotating the bobbin while in contact with said setaceous member and in the same direction that the thread is wound on the bobbin, whereby the thread-end is picked away from the bobbin.

4. Apparatus for removing the residual thread from bobbins which comprises a setaceous member, means for moving the bobbin tangentially along and in contact with said setaceous member, and means acting independently of said member for rotating the bobbin during said contact and in the same direction that the thread is wound on the bobbin, whereby the thread-end is picked away from the bobbin.

5. Apparatus for removing the residual thread from bobbins which comprises a setaceous member, means for supporting said bobbin with its thread in contact with the surface of said member, means acting independently of said member for rotating the bobbin while in contact with said setaceous member and in the same direction that the thread is wound on the bobbin, and means for driving said member so that its surface moves counter to the direction in which the bobbin surface is moving at its zone of contact with said setaceous member, whereby the thread-end is picked away from the bobbin.

6. Apparatus for removing the residual thread from bobbins which comprises a setaceous member, means for bringing the thread into contact with said setaceous member and effecting a relative tangential movement between them, and means acting independently of said member for rotating the bobbin while in contact with said setaceous member and in the same direction that the thread is wound on the bobbin, said relative tangential movement being counter to the direction of movement at the contact zone due to the rotation alone of the bobin, whereby the thread-end is picked away from the bobbin.

7. Apparatus for removing the residual thread from bobbins which comprises a cylindrical setaceous member, means for rotating said member, means for supporting said bobbin with its thread in contact with the rotating member, and means acting independently of said member for rotating the bobbin while in contact with said setaceous member and in the same direction that the thread is wound on the bobbin, whereby the thread-end is picked away from the bobbin.

8. Apparatus for removing the residual thread from bobbins which comprises a cylindrical setaceous member, means for supporting said bobbin with its thread in contact with the rotating member, means acting independently of said member for rotating the bobbin while in contact with said setaceous member and in the same direction that the thread is wound on the bobbin, and means for rotating said member in the same direction that the bobbin is rotated, whereby the thread-end is picked away from the bobbin.

9. Apparatus for removing the residual thread from bobbins which comprises a cylindrical setaceous member, means for supporting said bobbin with its thread in contact with the rotating member, means acting independently of said member for rotating the bobbin while in contact with said setaceous member and in the same direction that the thread is wound on the bobbin, means for rotating said member in the same direction that the bobbin is rotated, and means for moving the bobbin tangentially of the member in the same direction of linear movement of the member at its zone of contact with the bobbin, whereby the thread-end is picked away from the bobbin.

10. Apparatus for removing the residual thread from bobbins which comprises a cylindrical setaceous member, means for supporting said bobbin and moving it in a linear direction to bring its thread into contact with said setaceous member, means acting independently of said member for rotating the bobbin while in contact with said setaceous member and in the same direction that the thread is wound on the bobbin, and means for rotating said member in the same direction that the bobbin is rotated so that its surface speed is on the order of the speed of linear movement of the bobbin, whereby the thread-end is picked away from the bobbin.

11. Apparatus for removing the residual thread from bobbins which comprises a member presenting a yieldable thread-clinging surface, means acting independently of said member for rotating the bobbin with its thread in contact with said surface and in the direction to pick out the thread-end on the bobbin and means for engaging the picked-out thread-end and withdrawing all of the thread from the bobbin.

12. Apparatus for removing the residual thread from bobbins which comprises a member presenting a yieldable thread-clinging surface, means acting independently of said member for rotating the bobbin with its thread in contact with said surface and in the same direction that the thread is wound on the bobbin to thereby pick out the thread-end on the bobbin, and a pair of rotating contacting rollers to engage the picked-out thread-end and withdraw all of the thread from the bobbin.

13. Apparatus for removing the residual thread from bobbins which comprises means for picking out the thread-end and removing it from the thread package, a pair of oppositely rotating conical rollers in contact with each other throughout their lengths to grasp the removed thread-end between them and withdraw all of the thread from the bobbin, and means for advancing the bobbin from the small ends of the rollers to the large ends to withdraw the thread at a constantly increasing rate.

14. Apparatus for removing the residual thread from bobbins which comprises means for picking out the thread-end and removing it from the thread package, a pair of oppositely rotating setaceous conical rollers in contact with each other throughout their lengths to grasp the removed thread end between them and withdraw all of the thread from the bobbin, and means for advancing the bobbin from the small ends of the rollers to the large ends to withdraw the thread at a constantly increasing rate.

15. Apparatus for removing the residual thread from bobbins which comprises a setaceous member, means acting independently of said member for rotating the bobbin with its thread in contact with said member and in the same direction that the thread is wound on the bobbin to thereby pick out the thread-end on the bobbin, a pair of oppositely rotating conical rollers in contact with each other along their lengths, and means for advancing the bobbin from said member to said rollers to engage the picked-out thread-end with the rollers to effect withdrawal of thread, said advancing means serving to carry the bobbin from the smaller to the larger end of the rollers so that the withdrawal of the thread from the bobbin takes place at an increasing rate.

16. Apparatus for removing the residual thread from bobbins which comprises a cylindrical setaceous member, means for supporting said bobbin with its thread in contact with the rotating member, means acting independently of said member for rotating the bobbin while in contact with said setaceous member and in the same direction that the thread is wound on the bobbin, means for rotating said member in the same direction that the bobbin is rotated, means for moving the bobbin tangentially of the member in the same direction of the linear movement of the member at its zone of contact with the bobbin, whereby the thread-end is picked away from the bobbin, and a pair of oppositely rotating conical rollers in contact with each other along their lengths with their small ends disposed towards the setaceous member and along which the bobbin is advanced from the small ends to the large ends thereof, said conical rollers serving to withdraw the thread at a constantly increasing rate.

17. Apparatus for removing the residual thread from bobbins which comprises a pair of endless bands spaced laterally from each other, a plurality of spaced rods perpendicular to and connecting said bands, aligned sets of bobbin supports slidably mounted upon said rods and including rotatably mounted members for directly engaging the bobbin, a spring for drawing the bobbin supports of each set toward each other, means for delivering a bobbin to each set of bobbin supports, means for separating the aligned bobbin supports whereby the bobbin is received between them and then is engaged by said members, a member presenting a yieldable thread-clinging surface in position to be contacted by the thread on the bobbin, means acting independently of said member for rotating the bobbin while in contact with the latter member whereby its thread-clinging surface serves to thereby remove the thread-end, means for engaging the removed thread-end and withdrawing all of the thread from the bobbin, and means for driving said bands to advance the bobbin from said delivery means to said thread-end removing member and then to the thread withdrawal means, said means for separating said members serving to discharge the cleaned bobbin.

18. Apparatus for removing the residual thread from bobbins which comprises a pair of endless bands spaced laterally from each other, a plurality of spaced rods perpendicular to and connecting said bands, aligned sets of bobbin supports slidably mounted upon said rods and including rotatably mounted members for directly engaging the bobbin, a spring for drawing the bobbin supports of each set toward each other, means for delivering a bobbin to each set of bobbin supports, means for separating the aligned bobbin supports whereby the bobbin is received between them and then is engaged by said members, a setaceous member disposed to be contacted by the thread on the bobbin, means acting independently of said member for rotating the bobbin while in contact with the latter member whereby it serves to thereby remove the thread-end, a pair of oppositely rotating conical rollers in contact with each other throughout their lengths to engage the removed thread-end and withdraw all the thread from the bobbin, and means for driving the bands to advance the bobbin from said delivery means to said setaceous member and then along said conical rollers from their small to their large ends, said means for separating said members serving to discharge the cleaned bobbin.

19. Apparatus for removing the residual thread from bobbins which comprises a pair of endless bands spaced laterally from each other, aligned sets of bobbin supports spaced along said bands, a hopper for the bobbins to be cleaned, a gate mechanism for the hopper, an operative connection between the gate mechanism and said aligned bobbin supports to actuate the gate mechanism by the movement of each set of bobbin supports and release a bobbin which is delivered to each set of supports, a member presenting a yieldable thread-clinging surface in position to be contacted by the thread on the bobbin, means acting independently of said member for rotating the bobbin while in contact with the latter member whereby it serves to thereby remove the thread-end, means for engaging the removed thread-end and withdrawing all of the thread from the bobbin, and means for driving said bands to advance the bobbin from said delivery means to said member and then to the thread withdrawal means.

20. Apparatus for removing the residual thread from bobbins which comprises a pair of endless bands spaced laterally from each other, aligned sets of bobbin supports spaced along said bands, a hopper for the bobbins to be cleaned, a gate mechanism for the hopper comprising a bobbin discharge controlling element and a cooperating element thereabove to hold back the bobbins above the one to be discharged, an operative connection between the gate mechanism and said aligned bobbin supports to actuate the gate mechanism by the movement of each set of bobbin supports and release a bobbin which is delivered to each set of supports, a member presenting a yieldable thread-clinging surface in position to be contacted by the thread on the bobbin, means acting independently of said member for rotating the bobbin while in contact with the latter member whereby it serves to thereby remove the thread-end, means for engaging the removed thread-end and withdrawing all of the thread from the bobbin, and means for driving said bands to advance the bobbin from said delivery means to said member and then to the thread withdrawal means.

21. Apparatus for removing the residual thread from bobbins which comprises a pair of spaced horizontal shafts, a pair of equi-distantly spaced sprockets on each shaft, a chain running over corresponding ones of said pairs of sprockets to thereby present an upper flight and a lower flight for each chain, bobbin supporting means carried by each chain at points directly opposite from each other to constitute sets of supports for the bobbins, means associated with the upper flights of the chains to deliver a bobbin to each set of bobbin supporting means, a member presenting a surface for picking out the thread-end on each bobbin and disposed to be contacted by the thread on each bobbin at the initial portion of the lower flights of the chains, means acting independently of said member for rotating the bobbin while in contact with said member to bring the thread end to the surface of the member, and cooperating rollers disposed at a succeeding portion along the lower flights of the chains to withdraw all the thread from the bobbin.

22. Apparatus for removing the residual thread from bobbins which comprises a pair of spaced horizontal shafts, a pair of equi-distantly spaced sprockets on each shaft, a chain running over corresponding ones of said pairs of sprockets to thereby present an upper flight and a lower flight for each chain, retractable bobbin supporting means carried by each chain at points directly opposite from each other to constitute sets of supports for the bobbins, means for yieldably urging the supports of each set towards each other, means associated with the upper flights of the chains to deliver a bobbin to each set of said bobbin supporting means, cam means for separating the retractable bobbin supports in advance of the bobbin delivery means so the bobbin will be received between them, said cam means terminating at a point to permit the bobbin supports to move toward each other and pick up the bobbin under the influence of the yieldable means, a member presenting a surface for picking out the thread-end on each bobbin and disposed to be contacted by the thread on each bobbin at the initial portion of the lower flights of the chains, means acting independently of said member for rotating the bobbin while in contact with said member to bring the thread end to the surface of the member and cooperating rollers disposed at a succeeding portion along the lower flights of the chains to withdraw all the thread from the bobbin, said cam means serving to separate said bobbin supports to release the cleaned bobbin.

23. Apparatus for removing the residual thread from bobbins which comprises a pair of spaced horizontal shafts, a pair of equi-distantly spaced sprockets on each shaft, a chain running over corresponding ones of said pairs of sprockets to thereby present an upper flight and a lower flight for each chain, bobbin supporting means carried by each chain at points directly opposite from each other to constitute sets of supports for the bobbins, means associated with the upper flights of the chains to deliver a bobbin to each set of said bobbin supporting means, a setaceous member disposed to be contacted by the thread on each bobbin at the initial portion of the lower flights of the chains, means acting independently of said member for rotating the bobbin while in contact with the member in the same direction that the thread is wound on the bobbin to thereby remove the thread-end from the bobbin, and cooperating rollers disposed at a succeeding portion along the lower flights of the chains to withdraw all the thread from the bobbin.

24. Apparatus for removing the residual thread from bobbins which comprises a pair of spaced horizontal shafts, a pair of equi-distantly spaced sprockets on each shaft, a chain running over corresponding ones of said pairs of sprockets to thereby present an upper flight and a lower flight for each chain, bobbin supporting means carried by each chain at points directly opposite from each other to constitute sets of supports for the bobbins, means associated with the upper flights of the chains to deliver a bobbin to each set of said bobbin supporting means, a cylindrical setaceous member disposed to be contacted by the thread on each bobbin at the initial portion of the lower flights of the chains, means for rotating the bobbin while in contact with the member in the same direction that the thread is wound on the bobbin, means for rotating said cylindrical member in the same direction that the bobbin is rotated, whereby the thread-end is removed from the bobbin, and cooperating conical rollers disposed at a succeeding portion along the lower flights of the chains with their small ends toward the cylindrical member to withdraw all the thread from the bobbin.

25. The process for removing the residual thread from bobbins which comprises rotating the bobbin in the same direction that the thread is wound thereon while the thread is in contact with a thread-clinging surface, said bobbin being rotated independently of any motion of said thread-clinging surface.

26. The process for removing the residual thread from bobbins which comprises rotating the bobbin in the same direction that the thread is wound thereon while the thread is in contact with a thread-clinging surface while simultaneously advancing the bobbin longitudinally along the surface, said bobbin being rotated independently of any motion of said thread-clinging surface.

27. The process for removing the residual thread from bobbins which comprises rotating the bobbin in the same direction that the thread is wound thereon while the thread is in contact with a thread-clinging surface, and simultaneously advancing the bobbin longitudinally along the surface in the direction counter to the relative movement between the bobbin and said member due to the rotation of the bobbin, said bobbin being rotated independently of any motion of said thread-clinging surface.

28. The process for removing the residual thread from bobbins which comprises rotating the bobbin in the same direction that the thread is wound thereon in contact with a surface which is moving counter to the relative movement between the bobbin and said surface due to the rotation of the bobbin, said bobbin being rotated independently of any motion of said thread-clinging surface.

29. Apparatus for removing the residual thread from bobbins which comprises a member presenting a yieldable thread-clinging surface, means acting independently of said member for rotating the bobbin with its thread in contact with said surface, and means for causing a bodily relative movement between the bobbin surface and the thread-clinging surface to carry the thread end away from the bobbin after it is picked out.

30. The process for removing the residual thread from bobbins which comprises rotating the bobbin in the same direction that the thread is wound thereon while the thread is in contact with a surface which is moving counter to the movement of the bobbin upon said surface due to the rotation of the bobbin, and simultaneously advancing the bobbin longitudinally in the same direction that said surface is moving but at a slower rate, said bobbin being rotated independently of any motion of said thread-clinging surface.

JOHN J. WILSON.

REFERENCES CITED

The following references are of record in the file of this patent:

UNITED STATES PATENTS

| Number | Name | Date |
|---|---|---|
| 982,741 | Paquette | Jan. 24, 1911 |
| 1,109,949 | Walsh | Sept. 8, 1914 |
| 1,243,071 | Jopson | Oct. 16, 1917 |
| 1,412,719 | Stutts | Apr. 11, 1922 |
| 1,496,098 | Newell | June 3, 1924 |
| 1,631,920 | Crossland | June 7, 1927 |
| 1,654,472 | Stimpson | Dec. 27, 1927 |
| 2,070,193 | Alderman | Feb. 9, 1937 |
| 2,192,997 | Geier | Mar. 12, 1940 |